United States Patent Office 3,008,539
Patented Nov. 14, 1961

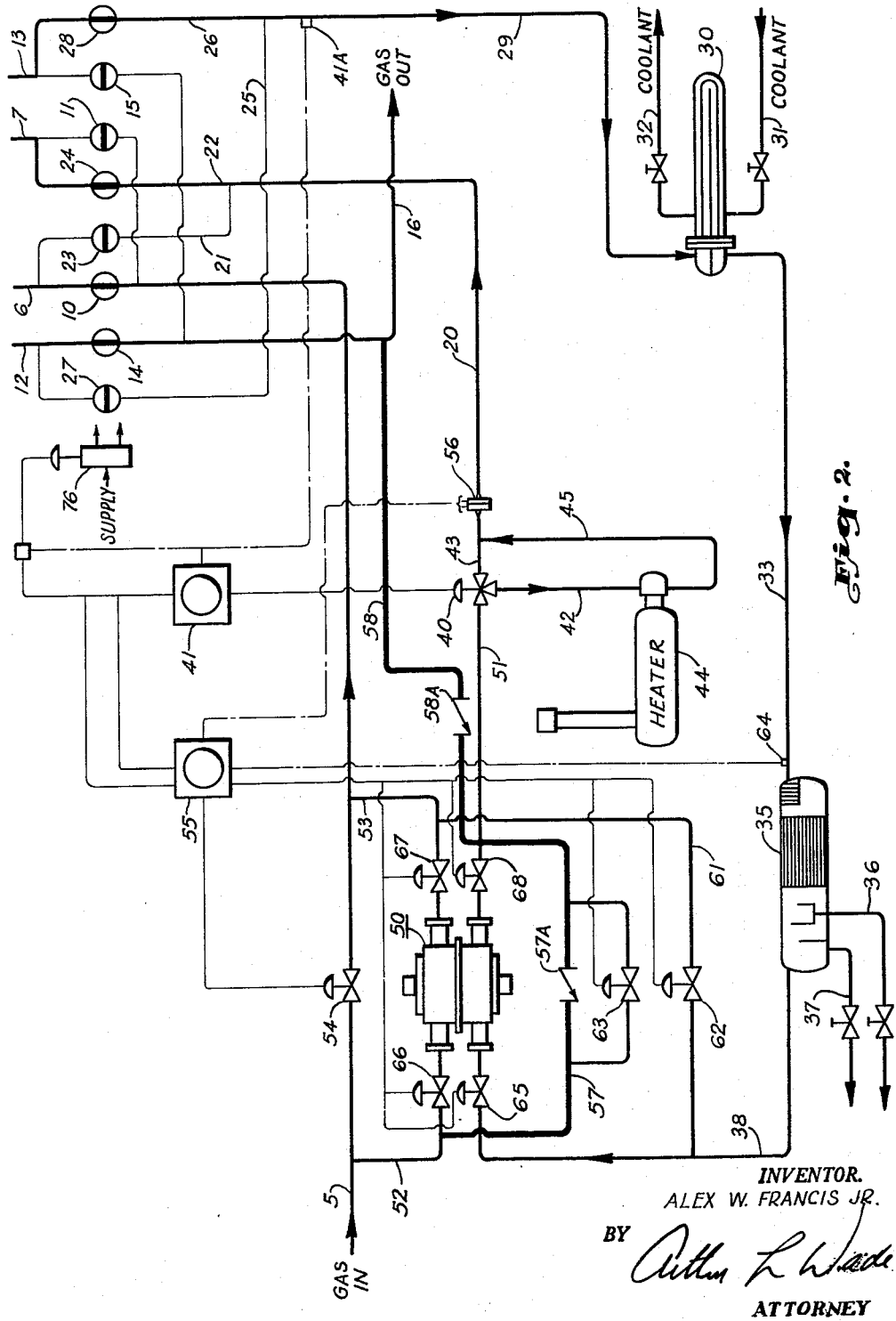

3,008,539
PROCESS AND APPARATUS FOR RECOVERING
HYDROCARBONS FROM GAS STREAMS
Alex W. Francis, Jr., Tulsa, Okla., assignor to National
Tank Company, Tulsa, Okla., a corporation of Nevada
Filed July 15, 1959, Ser. No. 827,356
11 Claims. (Cl. 183—4.7)

This invention relates to systems for processing natural gas to remove moisture and condensable hydrocarbons. More specifically, the invention relates to dehydration and hydrocarbon recovery systems using dry desiccant for adsorption and recirculated regeneration stream of gas communicated to the processed stream.

For the purposes of disclosing this invention, the flow of gas to be processed will be referred to as the flow, or main stream. The flow, or main, stream of natural gas from a well head is always saturated, or partially saturated, with moisture in accordance with its original pressure and temperature. If the gas is transmitted with this moisture in it, it may severely corrode the metal pipe line through which it is transmitted. Further, this moisture, at lowered temperatures, may form hydrates with hydrocarbons which will clog the pipe lines and valves. It is common practice to conduct wet gas through large cylinders filled with dry adsorbent material. Using at least two cylinders, it is possible to continuously transmit gas through the dry adsorbent by alternating the gas flow between the towers. The towers, with their adsorbent beds at least partially saturated with moisture, are reactivated with either heated air or gas.

Additionally, it is recognized that such streams of natural gas are saturated, or partially saturated with valuable condensable hydrocarbons, such as gasoline which can be removed from the gas stream by adsorbent material. The removal of both the condensable hydrocarbons and water from natural gas streams, prior to or during transmission is possible with a common dry adsorbent material and must be done efficiently and economically. Many of the problems of water and hydrocarbon removal by adsorbent material center about the use of the reactivation, or regeneration, fluid with which the water and hydrocarbons are removed from the saturated adsorption material. It has been customary to split off a portion of the processed stream and use it for this purpose. The split-off, reactivation, stream is passed through a heater to elevate its temperature to a degree that will raise its ability to vaporize and remove water and hydrocarbons as it passes through the beds of adsorption material. After passage through the beds the reactivation stream is cooled in a condenser to extract the liquids. The output of the condenser is received in a separator where the water and hydrocarbons are removed as separate liquid phases. The prior art shows how the gaseous portion of the reactivation stream may be returned to the main stream. However, there are fundamental advantages in recycling the reactivation fluid from the separator through the next bed of adsorbent to be reactivated rather than returning it to the flow, or main, stream.

The reactivation fluid, recycled as it is, from the separator is alternately cooled and heated. The pressure of this captive, closed, or recycled, reactivation fluid will fluctuate if the total inventory of fluid in the circuit is not changed as the regeneration fluid is heated and cooled. A differential in pressure between this closed circuit and the main stream is not desirable for a number of reasons. The differential pressure across the beds of adsorbent would mechanically stress the adsorbent material. Also the conduits for the circuit would be stressed by the internal pressure and threatened with failure. It is well-known to establish communication between the two streams to permit the shift in closed circuit inventory necessary to equalize the pressures of the circuits, as the recycled circuit and main stream are thermally unbalanced.

When a recycled regeneration gas stream is communicated with its main stream at one of several possible points, a process problem is created. The amount of fluid exchanged between the two circuits is relatively large. The exchanged amount can approach fifty percent, by volume, of the total captive fluid if the closed system is simply shunted through, and around, a heater to alternately heat and cool the regeneration fluid. If the communication with the main stream is only upstream of the adsorbent beds, the unprocessed fluid of the main stream, relatively rich in hydrocarbons, will be drawn into the captive stream when it is cooled. As the cooled, enriched, regeneration stream is passed through the hot, regenerated, bed to cool the bed, recoverable hydrocarbons will deposit in the bed and reduce the adsorptive capacity of the bed when the bed is switched to process the main stream.

If the communication is solely downstream of the beds, recoverable hydrocarbons of the captive stream will be lost on the heating cycle. The excess inventory of regeneration gas expelled downstream of the beds, as the regeneration stream is heated, will contain hydrocarbons which will be lost to the process, passing on down the main stream without process contact with the beds.

A fundamental object of the invention is to provide an improved adsorption process employing a plurality of beds of dry adsorbent material which are used to continuously adsorb hydrocarbon fractions from a gas stream, the latter being switched to flow through one bed and then another, with off the stream bed, or beds, being activated by a hot regenerating gas; the inventory of the regenerating gas stream being handled in an improved manner to effect an increase in the recovery of the hydrocarbon fractions from the main gas stream.

Another object of the present invention is to change the inventory of gas in a recycled regeneration circuit with main stream fluid to keep the regeneration stream at maximum efficiency and minimize the loss of recoverable hydrocarbons from the regeneration circuit.

The present invention contemplates a constant communication between the main, or processed, stream of gas and a recycled, or captive, regeneration stream for adsorbent beds with which the main stream is processed. The communication with the main stream is alternated between two points in the main stream, one on each side of the adsorbent beds. A check valve is arranged in each of the alternate communications so that flow into the regeneration stream, from the main stream, will be from the point downstream of the bed and flow out of the regeneration stream, to the main stream, will be from the point upstream of the bed.

Other objects, advantages and features of this invention will become apparent to one skilled in the art upon consideration of the written specification, appended claims, and attached drawings wherein:

FIG. 2 is an enlarged portion of FIG. 1 showing the control for the system in more detail and the embodiment of the present invention to better advantage.

FIGS. 1 and 2 are to be considered together. FIG. 2 shows a portion of the structure of FIG. 1 on a larger scale.

Figure 1:
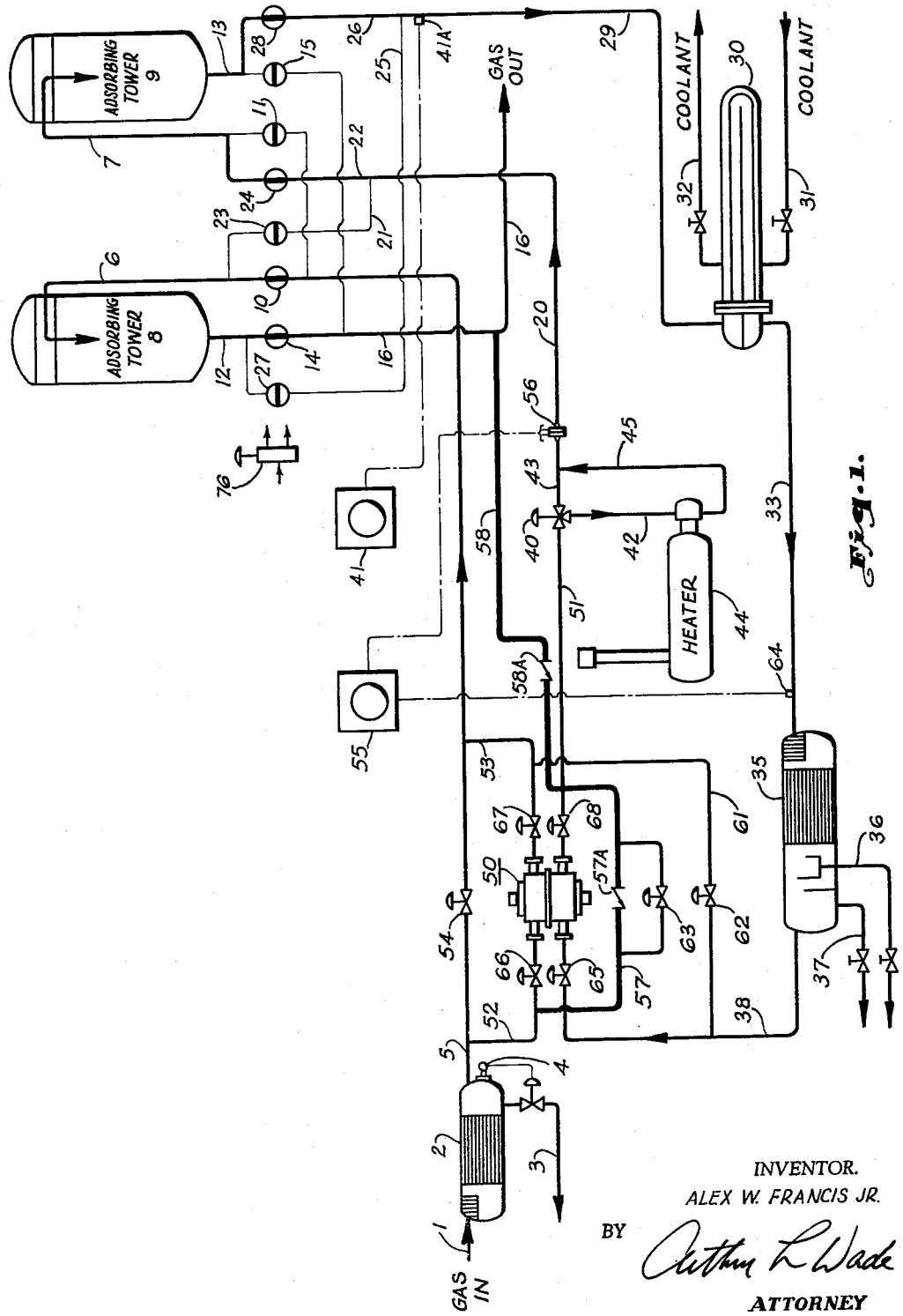
FIG. 1 is a diagrammatic flow diagram of a complete hydrocarbon recovery and dehydration system in which the present invention is embodied.

If FIG. 1 were utilized alone, the scale employed to show the complete recovery and dehydration system would be greatly encumbered with the inter-connecting control pipes and conduits. Therefore, in FIG. 1, only the variables sensed are indicated as connected to instruments responsive to their signals.

FIG. 2 shows the complete control system, but the towers and separator for the main stream have not been shown in order for the scale of the drawing to be enlarged to where all controlling, and controlled, elements can be shown with a minimum of confusion.

Main stream conduit

In FIG. 1, conduit 1 represents the means of bringing natural gas into the adsorption process controlled in accordance with the invention. The gas of conduit 1 is to be dried in the process and its condensable hydrocarbon content extracted and recovered. Conduit 1 specifically introduces the gas into separator 2.

Separator 2 may take any of several well-know forms. Any well-known form of vessel in which liquid and gaseous phase separate will be satisfactory. The separation process carried on in separator is a relatively crude function of knocking the liquids which arrive in conduit 1 from the gas stream. The liquids may be both water and hydrocarbons and are removed through conduit 3, controlled by level controller 4. The gaseous phases pass from separator 2 by way of conduit 5.

Conduit 5 is a part of the first circuit of the process which handles the main, or flow, stream of natural gas from which condensable hydrocarbons and water are removed by adsorption. Conduit 5 is divided into branch conduit 6 and branch conduit 7 in order to conduct the main stream through adsorbent beds. These branch conduits specifically connect to adsorbing tower 8 and adsorbing tower 9 and are valved to alternately direct the gas of conduit 5 through beds of adsorbent material in these towers. As illustrated, the towers are, essentially, cylinders with their longitudinal axes extended vertically. The flows from conduits 6 and 7 are shown directed downwardly through these towers.

Valve 10 in branch conduit 6 and valve 11 in branch conduit 7 alternately open and close to direct the main stream of conduit 5 through the adsorbent beds. Branch conduit 6 is represented with a relatively heavy line of drawing on each side of its valve 10, to indicate that the main stream is illustrated as passing through valve 10 and into tower 8.

Conduit 12 removes gas from tower 8. Conduit 13 removes gas from tower 9. Valves 14 and 15 alternately direct the main, or flow, gas stream from the towers into conduit 16. Conduit 12, through valve 14, is represented by a heavy line in order to indicate that the flow stream is passing from tower 8 into outlet conduit 16. The main circuit is now more completely defined as conduit 5 passing through valve 10 and valve 14 to conduit 16, as shown in FIG. 1, or alternately through valve 11 and valve 15 to conduit 16. The two sets of valves are time-cycled between their two positions to alternately open and close in directing the main stream through the two adsorbent beds as each bed approaches saturation with water and condensable hydrocarbons.

Adsorbent material

Various types of adsorbent material may be employed in towers 8 and 9. Silica gel has been successfully used to recover a large percentage of the condensable hydrocarbons in main streams. The selection of the specific adsorption material, and the arrangement of flow within the towers, depends on specific design conditions which are not considered further.

Once the adsorbent material has adsorbed the water and condensable hydrocarbons from the main stream, another stream of gas is required to remove these products from the bed. Specifically, a gas stream is passed through the bed, heated enough to vaporize the water and hydrocarbons. The adsorbent bed is thereby reactivated so it can again be used to remove another quantity of water and hydrocarbons from the main stream. The heated gas stream, with the vaporized water and hydrocarbons contained therein, is then cooled to condense the water and hydrocarbons.

Regeneration circuit

The circuit for the reactivation stream of gas is referred to as the second circuit and is traced from conduit 20. Branch conduits 21 and 22 alternately pass the reactivation gas from conduit 20 through towers 8 and 9. Branch conduit 21 is connected to conduit 6 between valve 10 and tower 8. Branch conduit 22 is connected to conduit 7 between valve 11 and tower 9. Conduit 21 passes through valve 23 and conduit 22 passes through valve 24. Conduit 22 is represented in heavy outline to indicate that the reactivation gas from conduit 20 is passing to tower 9 at the same time the main stream from conduit 5 is being passed to tower 8.

The reactivation gas passed through the towers is also removed through conduits 12 and 13. However, valves 14 and 15 are switched to prevent this reactivation gas from passing out of the system through conduit 16. Conduits 25 and 26 connect to conduits 12 and 13 between valves 14 and 15 and their respective towers. Valves 27 and 28 are included in conduits 25 and 26 in order to alternately pass the reactivation gas into conduit 29. Conduit 26 is represented in heavy line to show the circuit for the reactivation gas is completed through tower 9 from conduit 20 to conduit 29.

Recovery from reactivation gas

The vaporized hydrocarbon and water in the heated reactivation gas of conduit 29 is condensed therefrom in order to remove the water and recover the hydrocarbons. Several choices of cooling sources may be available for condensing these liquids from the reactivation gas in conduit 29. The one, or combination, or sources selected is a matter of design, involving the characteristics of the particular main stream, the availibility of relatively cool fluids, size of equipment, and etc.

In FIGS. 1 and 2 the reactivation stream of conduit 29 is illustrated as being simply cooled by an available stream of coolant, such as water. Heat exchanger 30 in shown as bringing the coolant of conduit 31 and 32 into intimate association with the captive, reactivation, stream of conduit 29. Vaporized hydrocarbons and water are thereby condensed into liquid and the mixture of condensed liquids and uncondensed gas is passed into conduit 33.

Three-phase separation of the mixture of liquids and gas in conduit 33 takes place in separator 35, one of many well-known forms. The liquefied hydrocarbons are removed through conduit 36, conducted to a stabilizer, and/or storage, not shown. Water is removed through conduit 37 for disposal. The remaining, cooled, reactivation gas is then delivered to conduit 38 for recycling through conduit 20 for the work of cooling the adsorption beds and removing additional water and hydrocarbons from the beds.

Cooling the towers 8 and 9

Using the specific arrangement shown in FIG. 1, it is reviewed that tower 9 is shown with a hot stream of reactivation gas passing through it in order to vaporize the hydrocarbons and the water left in the bed by the main stream. After this vaporization step, the bed within tower 9 should be cooled before the main stream is again passed through it. Cooling of the bed in tower 9 will raise its adsorptive capacity. Further, cooling the bed of tower 9 will prevent its heat being passed into conduit 16 when the main stream is passed through it.

Dumping heat from tower 9 into the main stream of conduit 16 could be dangerous. The resulting rise in temperature in the conduit 16 could buckle transmission lines and rupture connections and equipment downstream of the process, requiring costly, repairs and replacements. Therefore, a portion of the reactivation period for tower 9 is preferably used to pass a cooling stream of fluid through the bed of tower 9. Usually, it is preferable to simply bypass a heater provided for the reactivation circuit so the cool stream in conduit 38 upstream of the heater will reduce the temperature within the tower 9. It might also be feasible to route at least a portion of the main stream leaving tower 8 through tower 9 for this purpose if the heat balance of the system kept the temperature rise of the processed gas in conduit 16 low enough to protect the components downstream.

To carry out the technique of utilizing the captive, regeneration, stream itself to cool tower 9, valve 40 is provided to alternately pass the cool stream of conduit 38 through a heating source or directly into conduit 20. A time-cycle controller 41 is utilized to allocate the portion of each cycle used for this purpose. Controller 41 also contains a time-cycle mechanism whereby the two sets of tower valves may be switched to alternate the towers between the main and the reactivation streams by actuation of valve 76.

As the heat from the towers 8 and 9 is so important, a temperature responsive element 41A is placed in conduit 29, below the junction of branch conduit 25 and 26. Element 41A actuates a relay in the circuit between the time-cycle controller 41 and the tower valves. Should the temperature out of the tower on regeneration not be sufficiently cooled to safeguard downstream equipment, element 41A will hold the valves in the position they had when the excessive temperature was reached.

Valve 40 routes the cool stream of conduit 38 through either conduit 42 or 43. Conduit 42 takes the cool stream through heater 44 to pick up the heat required for reactivation of the adsorbent material. Conduit 45 receives the heated reactivation stream and passes it directly to conduit 20. Thus, valve 40 routes the cool stream of the second circuit from conduit 38 to conduit 20, alternately heated for predetermined times prior to passage through the towers.

*Actual operating conditions*

It is reasonable to expect about 80° F. temperature and 1200 pounds per square inch or more for a main stream received by the process. The reactivation gas of conduit 20 may be elevated to the order of 600° F. in order to vaporize the hydrocarbons and water in the absorbent beds. In passing through a tower, the heated reactivation stream may be dropped to the order of 360° F. To condense liquids from this reactivation gas, condenser 30 may drop the temperature to the order of 85° F. Thus it can be seen that conduit 20 receives the reactivation gas at a wide range of temperature values. Conduit 43 may deliver the reactivation gas in the order of 85° to 100° F. while conduit 45 may deliver the reactivation gas to conduit 20 in the order of 600° F.

*Motor-compressor 50*

FIGS. 1 and 2 illustrate a mechanical means to transfer the flow energy of the main stream in conduits 1 and 5 to the reactivation, or captive, circuit. This mechanical link is specifically embodied in a motor-compressor 50 such as disclosed and claimed specifically in S.N. 740,143, filed June 5, 1958, by Joseph L. Maher and Richard F. Baker, and controlled in S.N. 740,144, filed June 5, 1958, by Edwards M. Fontaine and Earnest C. Hill.

Essentially, motor-compressor 50 is a sliding vane type of motor on a common shaft with a sliding vane type of compressor. The compressor side of the unit receives the cool gas stream of conduit 38 and delivers it to conduit 51, connected directly to valve 40. Valve 40, as indicated heretofore, routes this gas output of the compressor to either conduit 42 or conduit 43.

The motor side of unit 50 is in a shunt conduit 52—53 around valve 54. Differential valve 54 is in conduit 5 and is positioned to regulate the amount of the main stream which is passed through conduit 52—53. Depending on the position of valve 54, more or less of the main stream gas is received by conduit 52 to develop the differential pressure force to regulate the speed of motor-compressor 50.

Valve 54 is normally modulated by the force developed from the differential pressures across orifice 56 in conduit 20. As the differential pressure across orifice 56 varies, the mechanism within controller 55 adjusts valve 54 to change the differential pressure across the motor of unit 50. Motor-compressor 50 thus has its speed adjusted to maintain the differential pressure across orifice 56.

*Orifice 56*

Orifice 56 is exposed to the variation in temperature of the regeneration gas as it is received from either conduit 45 or conduit 43. This flowing temperature of the captive regeneration stream thus varies the flow rate through this second circuit. Regulation of valve 54 from the differential across orifice 56 is in the correct direction to maintain the flow rate through orifice 56. As the flowing temperature decreases from the insertion of the gas stream of conduit 43 into conduit 20, motor-compressor 50 is caused to increase in output. The flow rate of the closed circuit goes up as the flowing temperature goes down. Alternately, as the heated stream of conduit 45 is caused to flow through orifice 56, the differential variation regulates valve 54 to slow motor-compressor 50 and decrease the flow rate through the closed second circuit. The result is automatic regulation in the correct direction to maintain the flow rate of regeneration gas required to efficiently strip the adsorbent material of the tower of water and hydrocarbons and cool the bed of material prior to its again receiving the main flow stream.

If the motor-compressor 50 experiences a sudden, or gradual, mechanical failure, the flow of regeneration gas will drop to a predetermined minimum value. At the predetermined minimum value, it is necessary to remove the motor-compressor from both circuits. Thus, the flow rate of gas in the regeneration circuit is a critical operative variable. The present invention utilizes the force of a predetermined value of this operative variable to convert the normally closed cycle of the regeneration system into an open cycle system, arrest the tower switching, and effectively remove the motor-compressor 50 from service. The regulation of valve 54, to develop the differential pressure force for circulating regeneration gas, continues on open, as well as closed, cycle operation.

Another operative variable of the regeneration gas is its temperature. The temperature of this gas going into the compressor side of unit 50 must be monitored so as to be maintained below a predetermined value. Under present design limitations, this temperature must not exceed 125° F. or the clearances between movable mechanical parts within the compressor side of unit 50 will be reduced until the parts are jammed together. Therefore, the temperature of the regeneration circuit is guarded by a mechanism responding to the effectiveness of the heat exchanger 30 to keep the temperature under control. Should this temperature exceed the predetermined limit, this operative variable will isolate the modulating impulse developed by flow in the regeneration circuit from valve 54 and cause the valve to open. This malfunction of the regeneration circuit is very serious. The entire system will shut down when the temperature to the compressor side exceeds the predetermined limit, and it will ordinarily be expected that a major repair or adjustment will have to be made to bring the temperature of the regeneration circuit down to normal.

The other temperature of the regeneration system which is most important is that of the towers, sensed by 41A. This temperature is in direct control of the impulses to the tower valves. Should this temperature be out of limits, both the tower valve switching and the cooling-heating valve switching are controlled directly to prevent excessive heat going down conduit 16 with the main stream.

Communication between main and regeneration streams

It has been described how the gas in the regeneration circuit is alternately heated and cooled by the function of valve 40 either shunting the reactivation gas through heater 44 or directly to conduit 20. This alternate heating and cooling of the captive circuit results in the inventory of gaseous fluid in the circuit fluctuating as the volume of the circuit conduits and vessels remain constant. Transfer of gaseous fluid between the main and reactivation circuits is desirable. Conduits 57 and 58 provide a means for making this transfer of gas. Specifically, conduit 57 is connected to the input side of the motor of unit 50 and to the output side of the compressor of the unit. A check valve 57A is included in this conduit 57 and permits the gas in the reactivation circuit to flow into the main stream ahead of the beds and the regeneration stream is expanded by heat. In this arrangement, all recoverable condensables within the reactivation circuit are exposed to a bed and processed.

Conduit 57 creates at least one problem when two-position tower valves are used. It will be recalled that the valves of the system alternating the connection of the main and reactivation gas streams between towers 8 and 9 are actuated simultaneously by the time-cycle controller 41. When these valves all shift from one of their positions to the other there is a finite period of time when they offer relatively little restriction to gas flow between the two circuits. Therefore, during each switching action, the differential in pressure between the two circuits would cause a transfer of gas from the circuit of the higher pressure to the circuit of the lower pressure. This transfer would reduce the pressure differential between conduits 52 and 53, across the motor of unit 50 if the gas of the main circuit would be allowed to surge through conduit 57. Motor-compressor 50 would momentarily stop. After the valve shift was complete, the differential pressure would again be developed across unit 50 and the unit begin to rotate with such sudden force as to place excessive mechanical strain on its parts. However, check valve 57A in conduit 57 now positively prevents this surge from the regeneration circuit into the main stream ahead of the motor of unit 50 at the time of tower shift. The problem of motor-compressor failure from this cause is thereby solved.

Conduit 58 is also connected to the output of compressor 50, extending to conduit 16, the output of the process. Check valve 58A is included in conduit 58 and permits flow of the processed gas of the main stream into the regeneration circuit as the captive stream is cooled by being bypassed around heater 44.

Conduits 57 and 58, with their check valves 57A and 58A, comprise a communication between the regeneration circuit at one point and the main stream at two points. The flow in this system is unidirectional, being from the lean, processed, stream into the regeneration circuit and to the stream to be processed ahead of the beds. In this arrangement there is a minimum of hydrocarbon loss from the regeneration circuit because the surplus inventory is always moved through the beds in the process. The regeneration stream is always maintained at a peak of efficiency for cooling with a minimum of adsorptive capacity reduction of the beds by its supply of the leanest gas available from the process.

Closed to open cycle conversion

Basically, to convert the closed cycle regeneration system of FIGS. 1 and 2 to an open cycle regeneration system, it is necessary to connect conduit 52 to conduit 51 and conduit 38 to conduit 53. Conduit 57 normally connects conduits 52 and 51 through check valve 57A. The present invention additionally provides conduit 61 between conduit 38 and conduit 53. A two-position valve 62 is provided in conduit 61. With conduits 57 and 61 connecting the main and regenerative streams as illustrated, regulation of valve 54 will force a portion of the main stream gas through the conduit 20 for regeneration and recovery of hydrocarbons. Of course, this connection returns this gas to the main stream of conduit 5 downstream of differential valve 54. Thus, the advantages of a closed, or captive cycle for regeneration are not realized. However, this alternate mode of operation does provide a means of maintaining the over-all dehydration and hydrocarbon recovery system in operation when motor-compressor 50 fails or an operative variable of the closed cycle exceeds its predetermined limits. There remains, only the problem of removing the restrictions to flow through conduit 57 and conduit 61 when the conversion is made.

Two-position valve 62 is opened by the control system. Valve 63 is provided as a bypass around check valve 57A. Valve 63 is opened at the same time valve 62 is opened to remove check valve 57A in conduit 57 as the reason for unidirectional flow through conduit 57. In FIG. 2, both valve 62 and valve 63 are indicated as controlled in parallel by the mechanism at 55. In general, the conversion is made when the operative variable of flow decreases to a predetermined minimum value in the captive, regeneration, circuit.

When the operative variable of the regenerative circuit has caused the conversion from a closed to an open cycle system, it is desired to isolate motor-compressor 50 from the main and regeneration circuits. Therefore, valves 65, 66, 67 and 68 are indicated in the conduits to and from unit 50. These valves may be closed and unit 50 removed for service or replacement. It is feasible to automaticaly close valves 65–68 from the impulse developed to open valves 62 and 63. If it is uneconomical to provide the means to carry out this automatic function it may be accomplished by manually operated valves.

Temperature of the regeneration circuit

When the flow through orifice 56 was previously discussed, the operative variable of temperature in the regeneration circuit directly associated with motor-compressor 50 was seen as desirably monitored. In the specific form adopted for motor-compressor 50, it is desirable that the temperature of the compressor side be kept below 125° F. as explained previously.

Temperature responsive element 64 is placed in conduit 33 to respond to the effectiveness of heat exchanger 30 on the circuit directly associated with motor-compressor 50. This operative variable develops a force through relays to maintain the tower valves at the position they had when the temperature exceeded its predetermined maximum value and maintain the valve 40 in the cooling position.

Review of operation

FIGS. 1 and 2 illustrate sufficient control structure for a dehydration and hydrocarbon recovery system to carry out the function of automatically shifting the stream of gas to be processed and the stream of gas for regeneration of the beds of desiccant employed between the towers containing the adsorbent beds. Further, the automatic shifting of the tower valves to shift the streams is co-ordinated with alternately heating and cooling the regeneration stream so the tower beds will be cooled after the heated regeneration gas has vaporized the water and hydrocarbons from the beds. The system is normally operated as a closed type. The regeneration gas is continuously recycled to perform its function.

Sufficient structure is disclosed to connect the system as an open cycle if the flow through the regeneration circuit decreases below a predetermined value. The flow of regeneration gas is regulated with a valve in the main, or processed, stream on both open and closed cycle.

The temperature of the regeneration circuit closely proceeding the motor-compressor overrides the valve in the main stream. Once exceeded, this temperature will open the main stream valve and hold the tower valves in position until this temperature is lowered.

The temperature of the regeneration circuit immediately following the beds monitors both the heater bypassing and tower switching. This temperature keeps the heater bypassed when a predetermined value is exceeded and keeps the hot tower in cooling position unitl it is safe to switch.

When the system operates as a closed cycle, the present invention is utilized to bring gas into the regeneration circuit from the processed, or tail, gas out of the towers. When the inventory of the regeneration circuit is decreased, the gas is expelled into the main stream of gas going to the beds to be processed. As the heater is bypassed, the regeneration gas shrinks and draws the lean, processed, gas which has passed through a bed of adsorbent. As the heater brings the regeneration gas up in temperature, expands its volume, the excess gas is pushed into the main stream of gas going to the beds of adsorbent.

The invention is embodied in pipe 57 as a communication between the two circuits. Flow through 57 is unidirectional, toward the main stream, because it includes check valve 57A. The pressure conditions at each end of pipe 57 establish the rate of flow. The check valve 57A determines the direction of flow. The result is the exposure of all recoverable hydrocarbons of the regeneration circuit surplus to the process.

The invention is also embodied in pipe 58 as a communication between the two circuits. Flow through 58 is unidirectional, toward the main stream, because of check valve 58A. The pressure conditions at each end of pipe 58 establish the rate of flow. The check valve 58A determines the direction of flow. The result is the regeneration stream is maintained at its highest level of cooling efficiency possible by reason of being replenished with the leanest gas available in the process. The adsorbent bed is prepared for service with a minimum of preloading with the type of material it is intended to recover.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and it within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. The process of recovering hydrocarbon liquid fractions from a main gas stream including, flowing the main gas stream through a bed of adsorbent material to remove adsorbable hydrocarbon fractions therefrom, discharging the stripped main gas stream from the adsorbent material bed, stopping the flow of the main gas stream through the bed, circulating a regeneration gas through a regeneration circuit which includes the bed and also includes a condensing and separating zone, heating the regeneration gas at a point downstream of the condensing and separating zone and upstream of the discharge from the bed whereby as said gas circulates through its circuit the gas regenerates the bed and picks up the hydrocarbon fractions which fractions are subsequently condensed and separated as the regeneration gas passes through the condensing and separating zone, discontinuing the heating of the regeneration gas whereby as said gas circulates through its circuit the gas cools the regenerated bed to increase its adsorptive capacity in preparation for a subsequent adsorbing cycle, establishing a first communication between the regeneration circuit and the main gas stream before the main gas flows through a bed to pass regeneration gas discharged from the heated regeneration circuit through a bed, and establishing a second communication between the regeneration circuit and the main gas stream after the main gas flows through a bed to pass processed gas into the regeneration circuit when the heating is discontinued to replace the gas discharged.

2. The process of recovering hydrocarbon liquid fractions from a main gas stream including, flowing the main gas stream through a bed of adsorbent material to remove adsorbable hydrocarbon fractions therefrom, discharging the stripped main gas stream from the adsorbent material bed, stopping the flow of the main gas stream through the bed, circulating a regeneration gas through a regeneration circuit which includes the bed and also includes a condensing and separating zone, heating the regeneration gas downstream of the condensing and separating zone and upstream of the discharge from the bed, whereby as said gas circulates through its circuit the gas regenerates the bed and picks up the hydrocarbon fractions which fractions are subsequently condensed and separated as the regeneration gas passes through the condensing and separating zone, discontinuing the heating of the regeneration gas after a predetermined period of time, thereafter continuing the circulation of the unheated regeneration gas through the regeneration circuit whereby the unheated gas cools the bed of adsorbent material, establishing a first communication between the regeneration circuit and the main gas stream before the main gas flows through a bed, the gas in the first communication establishing means being subject to the pressure conditions in the regeneration circuit and in the main gas stream before the main gas flows through a bed, the flow of gas through the first communication establishing means being controlled in accordance with the pressure conditions in the regeneration circuit and the main gas stream before the main gas flows through a bed and being limited in direction to flow out of the regeneration circuit, and establishing a second communication between the regeneration circuit and the main gas stream after the main gas flows through a bed, the gas in the second communication establishing means being subject to the pressure conditions in the regeneration circuit and in the main gas stream after the main gas flows through a bed, the flow of gas through the second communication establishing means being controlled in accordance with the pressure conditions in the regeneration circuit and the main gas stream after the main gas flows through a bed and being limited in direction to flow into the regeneration circuit.

3. The process of recovering hydrocarbon liquid fractions from a main gas stream including, flowing the main gas stream through a bed of adsorbent material to remove adsorbable hydrocarbon fractions therefrom, discharging the stripped main gas stream from the adsorbent material bed, stopping the flow of the main gas stream through the bed, circulating a regeneration gas through a regeneration circuit which includes the bed and also includes a condensing and separating zone, heating the regeneration gas downstream of the condensing and separating zone and upstream of the discharge of the bed whereby as said gas circulates through its circuit the gas regenerates the bed and picks up the hydrocarbon fractions which fractions are subsequently condensed and separated as the regeneration gas passes through the condensing and separating zone, establishing a first communication between the regeneration circuit and the main gas stream before the main gas flows through a bed to permit a flow of regeneration gas outwardly from the regeneration gas circuit to the main gas stream before the main gas flows through a bed substantially throughout the period of heating the regeneration gas circuit, discontinuing the heating of the regeneration gas after a predetermined period of time, continuing the circulation of the unheated regeneration gas through the regeneration circuit whereby the unheated gas cools the bed of adsorbent material in preparation for a subsequent adsorbing cycle, and flowing gas from the main gas stream after the main gas flows through a bed into the regeneration circuit substantially throughout the period of circulation of the unheated regeneration gas, to thereby dilute the regeneration gas.

4. The process as set forth in claim 3, wherein the outflow of the gas from the regeneration circuit during the heating step and the inflow of gas into the regeneration circuit during the period of circulation of unheated regeneration gas is downstream of the condensing and separating zone and upstream of the bed.

5. The process as set forth in claim 3, wherein the outflow of the gas from the regeneration circuit during the heating step and the inflow of gas into the regeneration circuit during the period of circulation of unheated regeneration gas is downstream of the condensing and separating zone and upstream of the bed.

6. The process set forth in claim 3, with the additional steps of discontinuing circulation of the unheated regeneration gas, and thereafter again directing the main gas stream through the bed to repeat the operation.

7. In an adsorption apparatus which comprises at least a pair of adsorption beds with means for alternately directing flow of a main gas stream having hydrocarbon fractions therein through one or the other of said beds to alternately place each bed on an adsorbing cycle, the improvement which resides in a regeneration gas circuit including heating means, condensing and separating means and that bed which is not on an adsorbing cycle, pump means for circulating the regeneration gas through the regeneration circuit whereby the gas is directed through the heating means and through the bed to regenerate said bed and to remove hydrocarbon fractions, said circulation also directing the gas through the condensing and separating means to separate said hydrocarbon fractions, control means for shutting off the heating maens after a predetermined period of time, whereby the circulation of unheated regeneration gas continues to flow through the bed in the regeneration circuit to complete the regeneration of and to cool said bed in preparation for the succeeding adsorbing cycle, first conductor means establishing unidirectional communication between the regeneration gas circuit and the main gas stream before the main gas stream is passed through a bed and having its opposite ends exposed to the pressure conditions in the regeneration gas circuit and in the main gas stream ahead of a bed, whereby the gas in the conductor means flows from the regeneration circuit in accordance with the pressure conditions in the regeneration circuit and in the main gas stream ahead of the beds, and second conductor means establishing unidirectional communication between the regeneration gas circuit and the main gas stream after the main gas stream is passed through a bed and having its opposite ends exposed to the pressure conditions in the regeneration gas circuit and in the main gas stream after a bed, whereby the gas in the conductor means flows into the regeneration circuit in accordance with the pressure conditions in the regeneration circuit and in the main gas stream after the beds.

8. In an adsorption apparatus which comprises at least a pair of adsorption beds with means for alternately directing flow of a main gas stream having hydrocarbon fractions therein through one or the other of said beds to alternately place each bed on an adsorbing cycle, the improvement which resides in a regeneration gas circuit including that bed which is not on an adsorbing cycle and a condensing and separating means, pump means for circulating a regeneration gas through said regeneration gas circuit, means for heating the regeneration gas downstream of the condensing and separating means and upstream of the discharge end of the bed whereby as said gas circulates through its circuit the gas regenerates the bed and picks up hydrocarbon fractions, said circulation also directing the gas through said condensing and separating means to separate hydrocarbon fractions, first means establishing communication between the regeneration gas circuit and the main gas stream before the main stream is processed by a bed to permit unidirectional flow of regeneration gas outwardly from the regeneration gas circuit to the main gas stream substantially throughout the period that the heated regeneration gas is being circulated, means for stopping heating of said regeneration gas after a predetermined period of time, whereby unheated regeneration gas is circulated through its circuit and through the bed to cool said bed in preparation for a subsequent adsorbing cycle, and second means establishing communication between the regeneration gas circuit and the main gas stream after the main stream is processed by a bed to permit unidirectional flow of regeneration gas inwardly to the regeneration gas circuit from the processed main gas stream substantially throughout the period of circulation of the unheated regeneration gas.

9. In an adsorption apparatus, the improvement set forth in claim 8 wherein the communication establishing means have connection with the regeneration gas circuit downstream of the condensing and separating means and upstream of the bed.

10. An apparatus for separating hydrocarbons from a gas stream including, a first bed of adsorbent material, a second bed of adsorbent material, a main gas stream inlet conductor communicating with the inlet ends of said beds, control means for directing the main gas stream to one or the other of said beds, whereby the bed through which the main gas stream is directed is on an adsorbing cycle to adsorb hydrocarbon fractions and extract the same from the main gas stream, a discharge conductor communicating with the discharge ends of the beds for conducting the main gas stream therefrom, control means for directing the main gas stream from that bed which is on an adsorbing cycle, a regeneration gas circuit including the bed through which the main gas is not flowing, also including, a heater, a conductor connecting the heater with the inlet of said bed, a return line extending from the discharge end of the bed to the heater, condensing and separating means connected in the return line, a pump in the regeneration circuit for circulating the gas therethrough, control means for alternately connecting the beds in the regeneration circuit, whereby one bed is on an adsorbing cycle and the other bed is on a regenerating cycle, and a first conductor with a check valve between the regeneration gas circuit downstream of the condensing and separating means and the main gas stream upstream of the bed which is on an adsorbing cycle, said conductor means having its opposite ends exposed to the pressure of the regeneration gas and to the pressure of the unprocessed main gas stream respectively so that flow will occur only from the regeneration gas circuit, the rate of flow being controlled by the pressure variations as caused by changes in the temperature of the gas contained in the regeneration circuit, and a second conductor with a check valve between the regeneration gas circuit downstream of the condensing and separating means and the main gas stream downstream of the bed which is on an adsorbing cycle, said conductor means having its opposite ends exposed to the pressure of the regeneration gas and to the pressure of the processed main gas stream respectively so that flow will occur only from the processed gas stream, the rate of flow being controlled by the pressure variations as caused by changes in the temperature of the gas contained in the regeneration circuit.

11. An apparatus as set forth in claim 10, wherein one complete regeneration cycle of a bed includes a heating period and a cooling period, control means in the regeneration circuit for operating the heater to heat the circulating regeneration gas during the first portion of each regeneration cycle and for shutting off the heater during the latter portion of said regeneration cycle, whereby the unheated regenerating gas circulates through the bed to cool the same.

References Cited in the file of this patent

UNITED STATES PATENTS

| | | |
|---|---|---|
| 2,799,362 | Miller | July 16, 1957 |
| 2,880,818 | Dow | Apr. 7, 1959 |